United States Patent [19]
Suzuki

[11] 3,714,763
[45] Feb. 6, 1973

[54] DEHUMIDIFYING DEVICE FOR AN AIR BRAKE

[76] Inventor: Kenichiro Suzuki, 41, 2-chome Negishi-machi, Kanagawa-ken, Yokohama, Japan

[22] Filed: Dec. 30, 1970

[21] Appl. No.: 102,637

[52] U.S. Cl. ................................................55/163
[51] Int. Cl. ...........................................B01t 53/04
[58] Field of Search.......................55/21, 33, 62, 163

[56] References Cited

UNITED STATES PATENTS

| | | |
|---|---|---|
| 3,464,186 | 9/1969 | Hankison et al.........................55/163 |
| 2,955,673 | 10/1960 | Kennedy et al...........................55/33 |
| 3,147,095 | 9/1964 | Kanuch.....................................55/33 |
| 3,225,517 | 12/1965 | Wachsmuth..............................55/33 |
| 3,399,510 | 9/1968 | Kayer et al................................55/33 |

Primary Examiner—Charles N. Hart
Attorney—Burns, Doane, Swecker & Mathis

[57] ABSTRACT

A dehumidifying method and device for an air brake by which air passed through a moisture adsorbent material is accumulated in the air brake reservoir for use. A portion of the dehumidified air is retained and passed back through the adsorbent material to the atmosphere, thereby reactivating the adsorbent material for subsequent use.

5 Claims, 2 Drawing Figures

PATENTED FEB 6 1973 3,714,763

INVENTOR.
Kenichiro Suzuki
BY Burns, Doane,
Swecker & Mathis

DEHUMIDIFYING DEVICE FOR AN AIR BRAKE

BACKGROUND OF THE INVENTION

The present invention is mainly concerned with the air dehumidifying apparatus for the air brakes of railroad vehicles.

Generally, in air brakes, the air pressure sent out from compressors is not only of a high temperature, but also contains oily particles and dirt. When the air is cooled in the piping, the majority of this moisture is condensed causing corrosion of the air reservoirs and pipes as it drains or causing breakdown of the brake cylinders when it freezes.

For an air brake to be made durable longer and free from breakdown accidents, it is desirable that the pressure air sent out from the compressor be thoroughly dried by means of purification through dehumidification.

The present invention has been devised for the purpose of developing a dehumidifying device for air brakes, by which it is possible to eliminate humidity and dirt in the pressure air sent out from a compressor, and at the same time, to send into the machine the pressure air after drying. The structure is featured by continuously setting up an air reservoir at the bottom of a double cylindrical pressure container consisting of inner and outer cans, mounting an air-transmissible bottom plate at an appropriate distance from the air reservoir at the lower part of the inner can, accommodating and fixing the said can in such a manner so that adsorbents are made exchangeable, connecting the space between both the inner and outer cans with the inner can by several small holes in the upper part of the said inner can, relaying pressure air from the compressor through the space between the inner and outer cans from the compressor to an air braking instrument and said air reservoir so that is passes from the small holes in the inner can through the mass transfer zone to be purified and dehumidified, and removing moisture from the adsorbent and releasing the adsorbed moisture to the atmosphere by means of backward flow of dry pressure air in the air reservoir by the action of an exhaust valve which is opened when the compressor stops in response to pressure in the main air reservoir in the air braking instrument reaching a fixed level.

THE DRAWINGS

THE DETAILED DESCRIPTION

Figure 2:
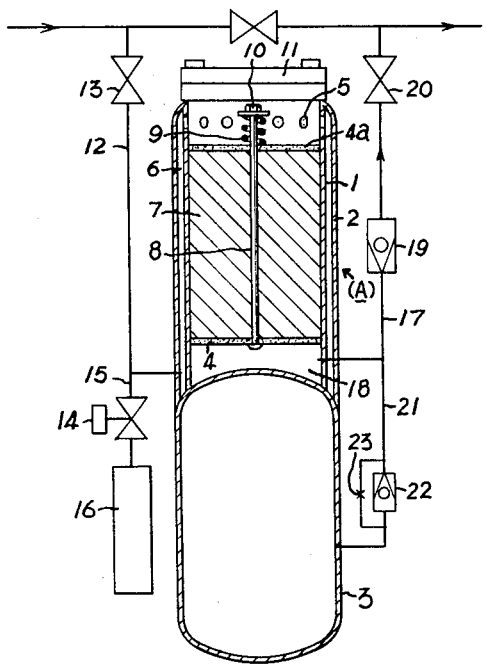
FIG. 2 is a systematic view of the apparatus of FIG. 1 taken along lines 2—2 thereof.
Figure 1:
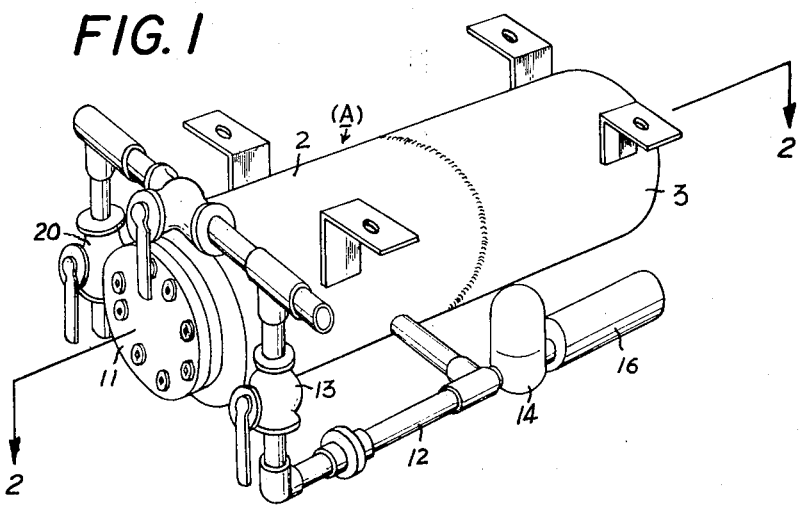
FIG. 1 is a pictorial view of the apparatus of the present invention.

Referring now to the drawings, (A) shows the double cylindrical pressure container consisting of an inner can 1 and an outer can 2, the bottom of which is adjacent to an air reservoir 3. The bottom of the inner can 1 is equipped with an air transmissible bottom plate 4 in the form of a metallic filter or the like at an appropriate distance from the air reservoir 3. The inner can 1 is also on its upper part provided with several small holes 5 which connect the space 6 between the inner and outer cans with the inside of the inner can 1. The adsorbent 7 is contained in the inner can 1, on which is arranged a top plate 4a which is similarly air-transmissible as the bottom plate 4.

A rod 8 is perpendicularly fixed in the center of the bottom plate 4 and the top plate 4a is secured by a spring 9 and a bolt 10 so that the adsorbent 7 will not flow about. On the upper end of the pressure container (A) is attached a covering plate 11 which is freely attachable and detachable so that the adsorbent 7 may be replaced. A pipe 12 connects the compressor (not shown) with the space 6 between the inner and the outer cans. A valve 13 is attached to the pipe 12 and an automatic valve 14 connects the pipe 12 and a pipe 15. A silencer 16 is provided.

A pipe 17 connects the space 18 between the bottom plate 4 and the air reservoir 3 and the air braking instrument. A check valve 19 is attached to the pipe 17 for checking backward flow and another valve 20 is provided. A pipe 21 connects with the pipe 17 and extends to the air reservoir 3. A check valve 22 is attached on the pipe 21 for checking backward flow and has an orifice 23 in parallel therewith.

In operation, the pressure air sent out of the compressor is separated from the particles of solid, watery or oily substances by centrifugal force by being blown into the space 6 through the valve 13. The air is dried while passing from the small holes 5 through the adsorbent 7, and then sent into the main air reservoir (not shown) of the air braking instrument through the check valve 19 and the valve 10. At the same time, air is fed into the air reservoir 3 through the check valve 22.

Thus, when the pressure in the main air reservoir rises up to the set pressure, the pressure switch, specially equipped, goes into action, stopping the compressor and at the same time, the automatic valve 14 is released, opening the space 6 to the atmosphere and letting the dried pressure air in the air reservoir 3 flow backward through the orifice 23, through the adsorbent 7 from the space 18 to be exhausted into the atmosphere through the space 6, the automatic valve 14 and the silencer 16. When pressure air in the main air reservoir has been consumed due to the operation of the brake, the compressor is set into motion again, while the automatic valve 14 is closed. It is through repeating the process of dehumidification and purification of pressure air and regeneration of the adsorbent in keeping pace with the operation of the compressor that pure and thoroughly dried air for operational use is supplied to the air braking instrument.

The adsorbent used in the above-mentioned apparatus should desirably be one of cartridge type.

The present invention being described above, when the invented apparatus is adapted in an air brake, always pure and thoroughly dried air can be sent into it, and, as the result, the durable life of the air brake is made longer, the danger of causing breakdown accidents due to drain, etc. is eliminated, and also the whole size of the apparatus can be made smaller, thus making the device ideal, particularly when it is adapted as the dehumidifier in air brakes of rolling stock.

What is claimed is:

1. A compact dehumidifying device comprising:
    an outer can;
    an inner can disposed generally coaxially within said outer exterior walls of said inner can being spaced from the interior walls of said outer can to define a first space;
    means for introducing air to be dehumidified into said first space;

said inner can containing removable moisture-absorbing means and being apertured to permit the flow of air from said first space through said moisture-absorbing means to a second space within said inner can;

a regeneration air reservoir integral with said inner and outer cans adjacent said second space;

first means connecting said second space to an output pipeline leading to said regeneration air reservoir and to a main air storage reservoir distinct from said regeneration air reservoir; and, second means for disconnecting said second space from said output pipeline while connecting said first space with the atmosphere so that highly dehumidified air from said regeneration air reservoir flows through said second space, through the moisture-absorbing means in said inner can, and through said first space to the atmosphere and the use of air from said main air storage reservoir for regeneration purposes may be avoided.

2. The dehumidfying device of claim 1 wherein said regeneration air reservoir and said outer and inner cans are generally cylindrical in shape and said regeneration air reservoir is secured to said inner and outer cans in an end-to-end relationship.

3. The dehumidifying device of claim 1 wherein said second means is responsive to the pressure of the dehumidified air in said main air storage reservoir.

4. The dehumidifying device of claim 1 wherein said second means includes a check valve and a pressure-sensitive valve.

5. The dehumidifying device of claim 1 wherein said regeneration air reservoir and said outer and inner cans are generally cylindrical in shape and said regeneration air reservoir is secured to said inner and outer cans in an end-to-end relationship; and, wherein said second means is responsive to the pressure of the dehumidified air in said main air storage reservoir.

* * * * *